United States Patent [19]
Shoge

[11] Patent Number: 5,882,274
[45] Date of Patent: Mar. 16, 1999

[54] INTERNALLY MOUNTED BICYCLE TRANSMISSION

[75] Inventor: Akihiko Shoge, Shimonoseki, Japan

[73] Assignee: Shimano, Inc., Osaka, Japan

[21] Appl. No.: 806,908

[22] Filed: Feb. 26, 1997

[30] Foreign Application Priority Data

Apr. 22, 1996 [JP] Japan .................................. 8-099925

[51] Int. Cl.⁶ .................................................. F16H 3/44
[52] U.S. Cl. .......................................... 475/297; 475/298
[58] Field of Search ................................. 475/296, 297, 475/298; 192/6 A, 93 A, 93 R, 48.91

[56] References Cited

U.S. PATENT DOCUMENTS

| | | | |
|---|---|---|---|
| 3,134,274 | 5/1964 | Schwerdhofer | 192/6 A |
| 3,194,089 | 7/1965 | Schwerdhofer | 192/6 A |
| 3,726,156 | 4/1973 | Tijen et al. | 475/297 X |
| 4,276,973 | 7/1981 | Fukui | 192/47 |
| 5,078,664 | 1/1992 | Nagano | 475/297 |
| 5,273,500 | 12/1993 | Nagano | 475/297 X |
| 5,445,573 | 8/1995 | Nurnberger | 475/298 |
| 5,769,750 | 6/1998 | Rickels | 475/298 |
| 5,785,625 | 7/1998 | Matsou et al. | 475/298 |

FOREIGN PATENT DOCUMENTS 57-42792  9/1982  Japan .

*Primary Examiner*—Charles A. Marmor
*Assistant Examiner*—Scott Lund
*Attorney, Agent, or Firm*—James A. Deland

[57] ABSTRACT

A bicycle transmission includes a hub axle, a drive member rotatably mounted around the hub axle, a hub body rotatably mounted around the hub axle, and a gear mechanism coupled between the drive member and the hub body for communicating rotational force from the drive member to the hub body through multiple transmission paths. A clutch is rotatably mounted around the hub axle, wherein the clutch is movable in the direction of a longitudinal axis of the hub axle for selecting a rotational force transmission path through the gear mechanism. A clutch operator for operating the clutch includes a first guide surface formed along the hub axle and a first shift key that operates the clutch when the first shift key is moved along the first guide surface. The clutch includes a first cam face that is inclined relative to the axis of the hub axle for contacting the first shift key and for converting rotational force of the clutch into axial displacement of the clutch to ensure operation of the clutch.

41 Claims, 14 Drawing Sheets

FIG. 15A
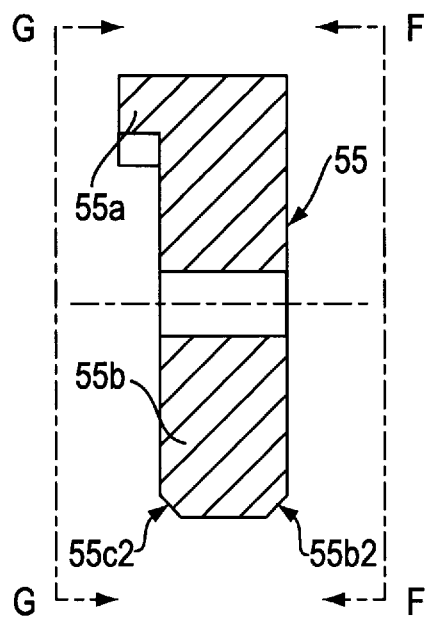
FIG. 15C  FIG. 15B
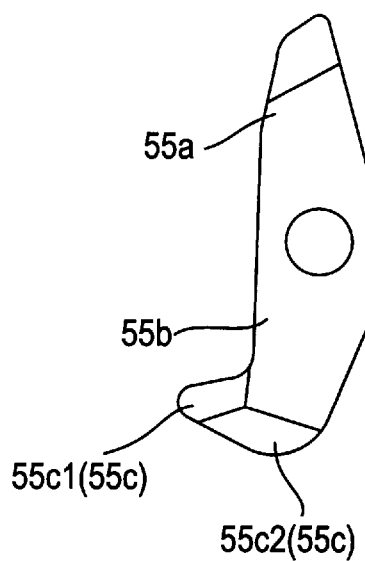 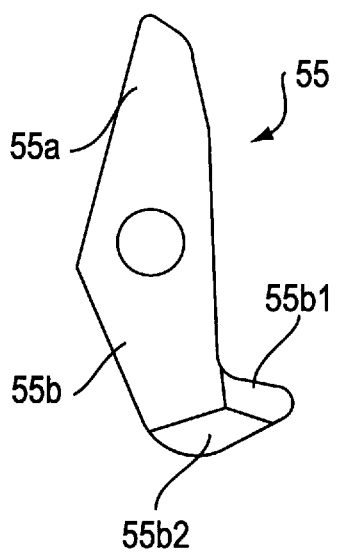

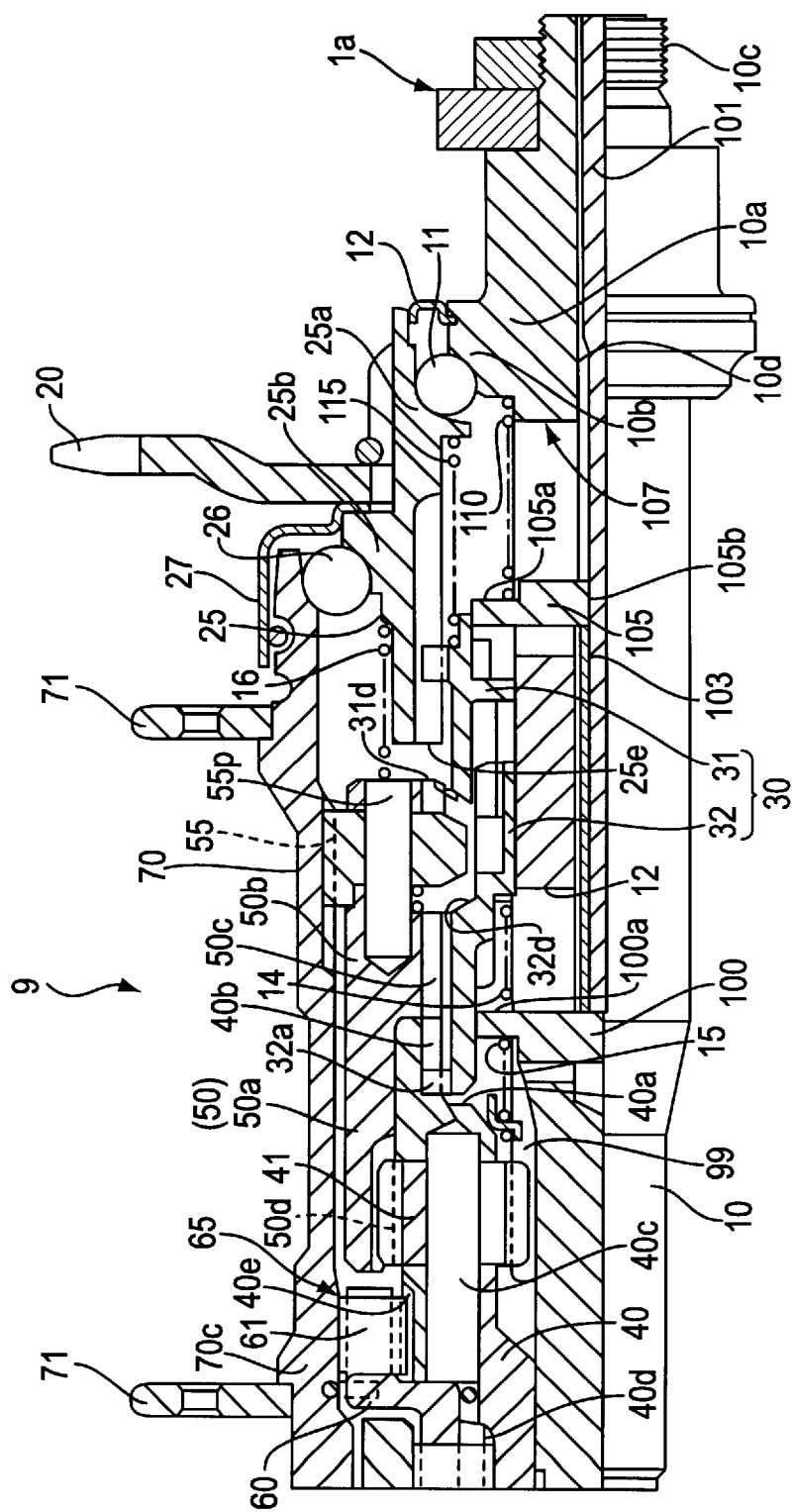

INTERNALLY MOUNTED BICYCLE TRANSMISSION

BACKGROUND OF THE INVENTION

The present invention is directed to bicycle transmissions and, more particularly, to bicycle transmissions internally mounted within a wheel hub.

An example of a conventional internal shifter unit is the shifter unit disclosed in U.S. Pat. No. 5,078,664. An internal shifter unit is usually provided with a clutch that is used to select among a plurality of drive force transmission paths via a gear mechanism equipped with a planet gear or the like provided on the inside. When the shift operation unit attached to the handlebar or the like is operated, the inner cable of the shift cable is pulled or relaxed to operate the clutch. When the inner cable is pulled, the clutch can be operated by this pulling force, but since this pulling force is absent when the cable is relaxed, the energizing force of a return spring or the like is utilized to operate the clutch in the reverse direction.

In the case of an internal shifter unit, when the pedal is forcefully pressed down and a large drive load is applied, a large separation resistance is generated in the gear mechanism inside the internal shifter unit. More specifically, when a drive force is applied, the friction increases at the engaged portion between two gears or between a pawl and a tooth in the transmission, which is a problem in that clutch switching becomes more difficult. The spring force of the return spring can be increased so that the return spring will overcome this separation resistance and allow operation when the cable is relaxed, but then when the cable is pulled it will must pull against this increased spring force of the return spring, so a greater cable pulling force is needed. Thus, if the strength of the return spring is reduced, the operating force with respect to the clutch is weakened during relaxation of the cable, and if the spring strength is increased, a greater force is needed to pull the cable.

SUMMARY OF THE INVENTION

The present invention is directed to an internally mounted bicycle transmission which can be operated under load without requiring a substantial cable pulling force. In one embodiment of the present invention, a bicycle transmission includes a hub axle, a drive member rotatably mounted around the hub axle, a hub body rotatably mounted around the hub axle, and a gear mechanism coupled between the drive member and the hub body for communicating rotational force from the drive member to the hub body through multiple transmission paths. A clutch is rotatably mounted around the hub axle, wherein the clutch is movable in the direction of a longitudinal axis of the hub axle for selecting a rotational force transmission path through the gear mechanism. A clutch operator for operating the clutch includes a first guide surface formed along the hub axle and a first shift key that operates the clutch when the first shift key is moved along the first guide surface. The clutch includes a first cam face that is inclined relative to the axis of the hub axle for contacting the first shift key and for converting rotational force of the clutch into axial displacement of the clutch to ensure operation of the clutch. In other words, the rotational force of the clutch is used as a boost to cause the clutch to shift even when the clutch operates under load.

Typically, the clutch moves in one axial direction to downshift the bicycle transmission and in an opposite axial direction to upshift the bicycle transmission. The structure described above aids the shifting operation in one of these directions. If desired, the transmission can be equipped to aid the shifting operation in the other direction. In this case the clutch operator further includes a second guide surface formed along the hub axle and a second shift key that operates the clutch in the reverse direction when the second shift key is moved along the second guide surface. In this case the clutch further includes a second cam face that is inclined relative to the axis of the hub axle for contacting the second shift key and for converting rotational force of the clutch into axial displacement of the clutch in the reverse direction.

BRIEF DESCRIPTION OF THE DRAWINGS

FIG. 15a is a cross sectional view of a particular embodiment of a transmission pawl according to the present invention;

FIG. 15b is a view taken along line F—F in FIG. 15a;

FIG. 15c is a view taken along line G—G in FIG. 15a;

FIG. 16 is a partial cross sectional view of an alternative embodiment of a bicycle transmission according to the present invention;

DETAILED DESCRIPTION OF THE EMBODIMENTS

Figure 1:
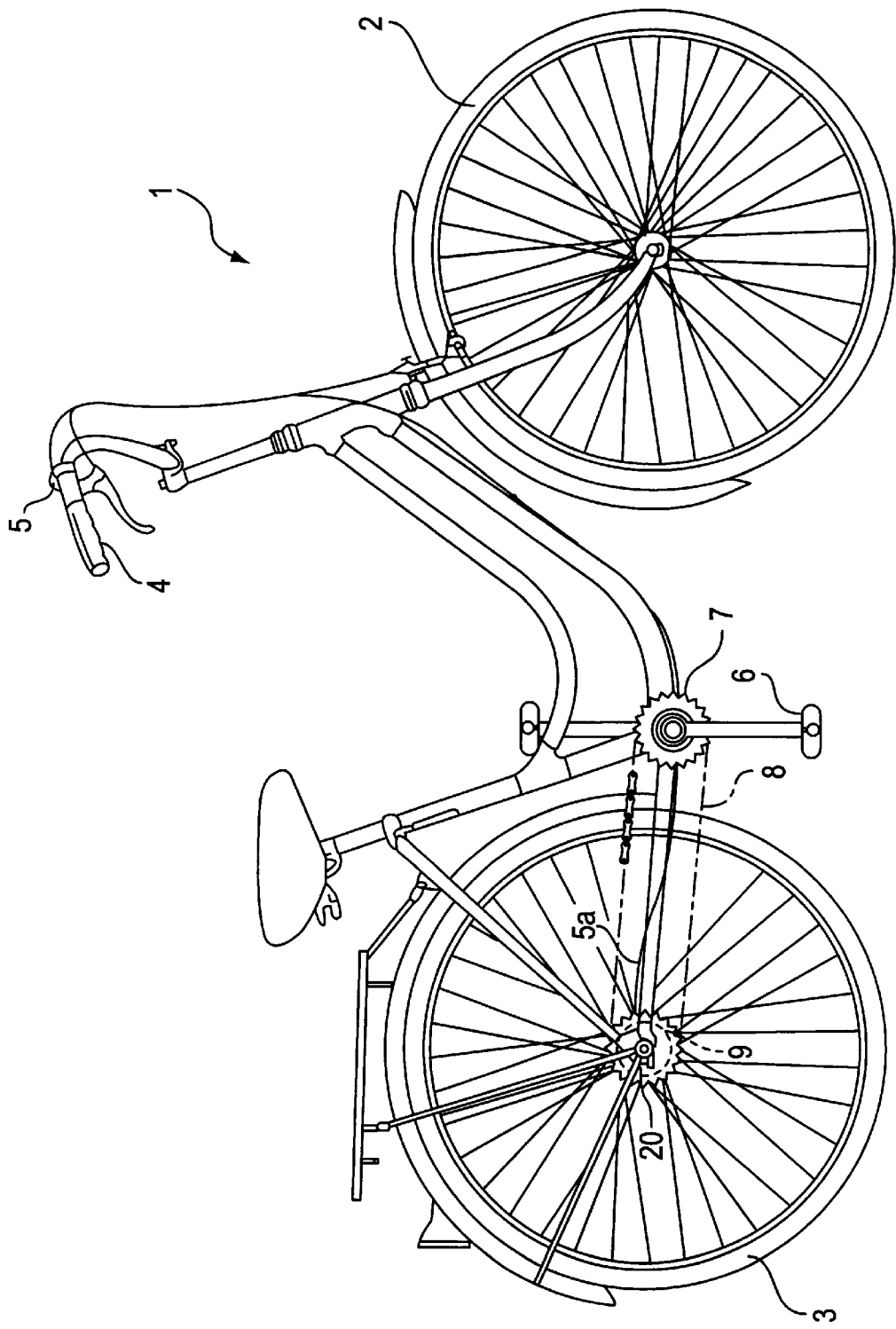
FIG. 1 is a side view of a bicycle.

FIG. 1 shows a bicycle 1 in which the internal hub 9 of the present invention is installed. Here, 2 is the front wheel, 3 is the rear wheel, 4 is the handlebar, 5 is a shifter that shifts the internal hub 9, and 5a is a cable that is pulled by the shifter 5. 6 is a pedal, and the drive force of the pedals 6 is transmitted to the internal hub 9 via a front chainwheel 7, a chain 8, and the sprocket 20 of the rear wheel 3. In the description that follows, the rotational direction of the pedals and other rotatable parts corresponding to the forward direction of the bicycle 1 will be called the first rotational direction or forward pedalling direction, and the opposite direction will be called the second rotational direction or back pedalling direction.

When the pedals 6 are rotationally operated in the first rotational direction, the drive force thereof is transmitted to the rear wheel 3 at a speed-down or speed-up ratio corresponding to the speed step set by the shifter 5. There are three speed steps in this embodiment, and switching is possible between a first speed position (top position), a second speed position (neutral position), and a third speed position (low position). Further, when the pedals 6 are rotationally operated in the reverse direction, a coaster brake mechanism housed in the internal hub 9 is actuated, and a braking force acts on the rear wheel 3.

Figure 2:
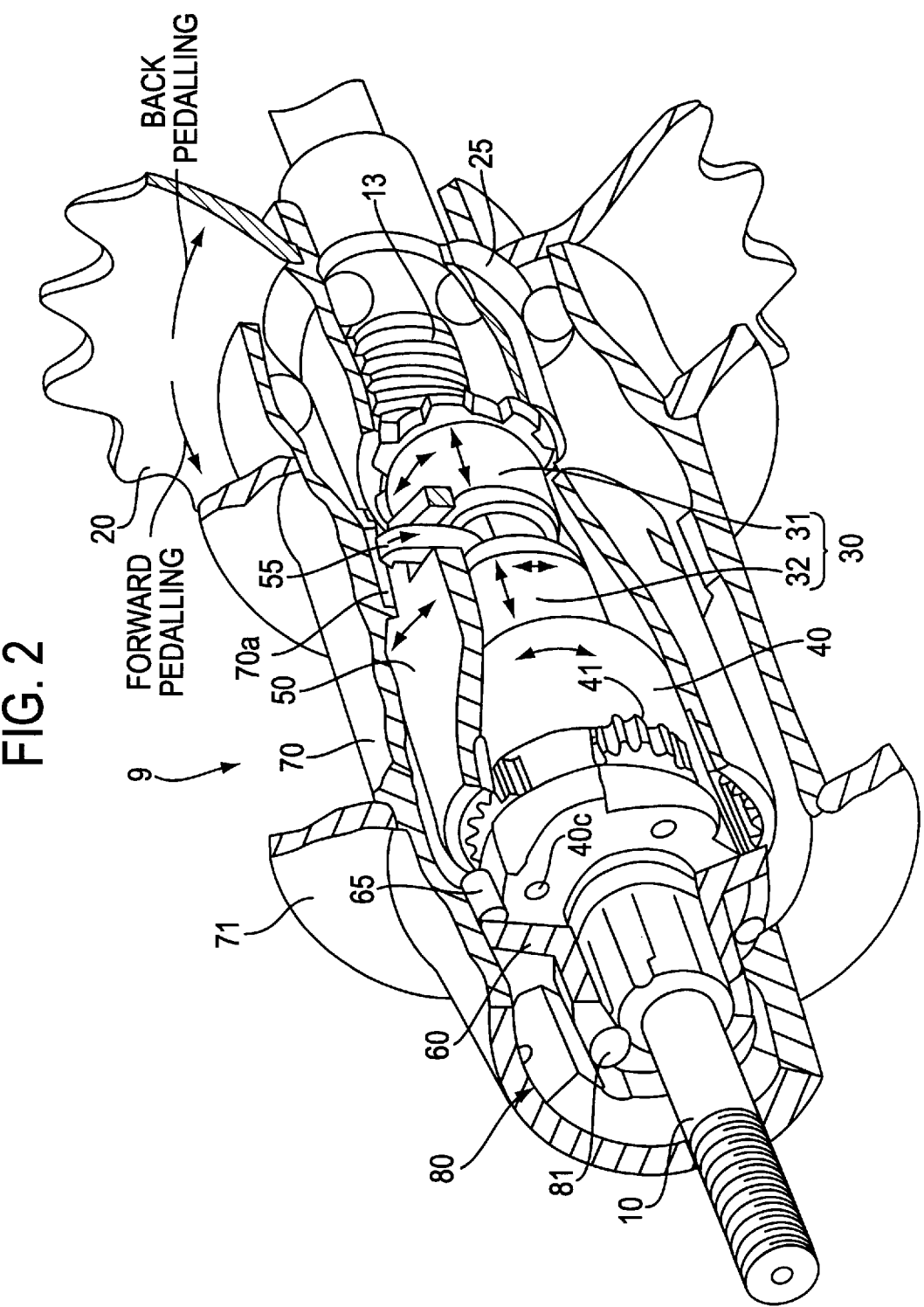
FIG. 2 is a partial cut away view of a particular embodiment of a bicycle transmission according to the present invention.

The internal shifter pertaining to the present invention will now be described in detail through reference to the figures. As shown in an overview in FIG. 2, this internal shifter comprises a hub axle 10, a driver 25 that is rotatably supported by the hub axle 10 and fixes the sprocket 20, a hub body 70 that fixes the spokes of the wheel of the bicycle and is rotatably supported with respect to the hub axle and the driver 25, a gear mechanism that is interposed between the driver 25 and the hub body 70 and includes a planet gear for transmitting the drive force from the driver 25 to the hub body 70 through a plurality of drive paths, a clutch means for selecting among the plurality of transmission paths, and so on.

In the description that follows, the "axial direction" refers to the same direction as the axis X of the hub axle 10. The "first end in the axial direction" refers to the hub axle end 10c on the right side in FIG. 3, while the "second end" refers to the left end 10d of the hub axle 10 on the opposite side. The "radial direction" or "peripheral direction" is the radial direction or peripheral direction with respect to the hub axle 10.

The hub axle 10 is fixed to the frame fork 1a of the bicycle, and the driver 25 is rotatably supported with respect to the hub axle 10 via a bearing mechanism. This bearing mechanism is provided in the region at one end of the hub axle 10, and it consists of a ball race 10a that forms the large diameter component of the hub axle 10, a plurality of balls 11 provided in the peripheral direction of the hub axle 10, and a bearing surface 25a provided to the inside in the radial direction of the driver 25 and to the outside in the axial direction of the hub axle 10. Therefore, the plurality of balls 11 are sandwiched between the bearing surface 25a of the driver 25 and a bearing surface 10b that is on the outside in the radial direction of the ball race 10a and faces inward in the axial direction.

The driver 25 is in the overall form of a cylinder that extends in the axial direction, and it fixes the sprocket 20 engaged with the chain 8 to the axial direction first end (10c). A ring-shaped cover 12 is provided between the driver 25 and the hub axle 10 in order to prevent dust, grit, and the like from getting into the internal shifter. The portion of this cover 12 on the inside in the radial direction is fixed to the hub axle 10, and the portion on the outside in the radial direction hits the driver 25 and thereby blocks the gap formed between the hub axle 10 and the driver 25.

The surface on the outside in the radial direction of the driver 25 is provided with a bearing surface 25b that serves as a cone and is in contact with balls 26 that are used to rotatably support the hub body 70. A spline 25c that is used to engage a clutch 30 (discussed below) is provided on the inside in the axial direction of the bearing surface 25a. This spline 25c extends in the axial direction from the end 25e on the inside in the axial direction of the driver, and the length thereof is at least half the length in the axial direction of the driver 25.

The hub body 70 is in the overall form of a cylinder that covers nearly the entire length of the hub axle 10, and it is rotatably supported by balls 26 with respect to the driver 25 on the side of the first end in the axial direction. A cover 27 that is used to cover the gap formed between the hub body 70 and the driver 25 is provided between these two members, and it is fixed with respect to the driver 25. The second end side of the hub body 70 is equipped with a similar bearing mechanism, which is rotatably supported on the hub axle 10 by balls 26b.

A gear mechanism transmits the drive force from the driver 25 to the hub body 70 via a plurality of drive paths. This gear mechanism is made up of a clutch 30 that engages with the driver 25, an operating unit (discussed below) that is used to operate the clutch 30, a sun gear 99 provided around the outer periphery of the hub axle 10, a planet gear 41 that engages with this sun gear 99 and rotates while revolving around the hub axle 10, a planet gear rack 40 that supports this planet gear 41, a ring gear 50 positioned on the outside in the radial direction of the planet gear, and a transmission pawl 55 that oscillatably pivots with respect to this ring gear 50 and that is capable of transmitting the drive force with respect to the hub body 70.

The clutch 30 is made up of two parts, namely, a first clutch 31 and a second clutch 32 that is separate from the first clutch 31. These two parts are able to move integrally in the axial direction and in the peripheral direction, and are also capable of relative displacement in the axial direction. A clutch operating unit that includes a first shift key 100 is what moves and operates this clutch 30. The first clutch 31 is engaged with the driver 25. The first clutch is also able to come into contact with a transmission pawl 55, and when it hits the end 55b of this transmission pawl 55, it knocks down this transmission pawl 55 and makes possible the disengagement of the transmission pawl 55 from the hub body 70. The second clutch 32 can be engaged with both the planet gear rack 40 and the ring gear 50, and movement of the second clutch in the axial direction results in engagement of either the gear rack 40 or the ring gear 50. The planet gear rack 40 is engaged with the ring gear 50, and it transmits to the ring gear 50 the drive force that has been transmitted through the clutch 30. Ring gear 50 further transmits this drive force through the transmission pawl 55 to the hub body 70. Alternatively, planet gear rack 40 receives the drive force from the ring gear 50 and transmits it to the hub body 70 via a roller clutch mechanism 65.

In this embodiment, movement of the clutch 30 between first, second, and third positions at intervals in the axis X direction on the hub axle 10 makes three speeds possible, namely, top (the first speed step), neutral (the second speed step), and low (the third speed step). This clutch 30 is energized overall in the second end direction of the hub axle 10, that is, in the direction of the first shift key 100, by a first energizing spring 13.

The first clutch 31 is in the overall form of a cylinder that extends in the axial direction, and a plurality of teeth 31a that engage with the driver 25 are provided to the outer peripheral surface in the first axial end direction. The second clutch 32 has an engagement pawl 32a that engages with the ring gear 50 or the planet gear rack 40 on the outer peripheral surface in the second axial end direction. When this second clutch 32 is moved over the hub axle 10 in the axial direction along with the first clutch 31, the engagement pawl 32a engages with the gear rack 40, or engages with the ring gear 50. The first shift key 100 moves and operates the entire clutch 30 by moving this second clutch 32.

Figure 3:
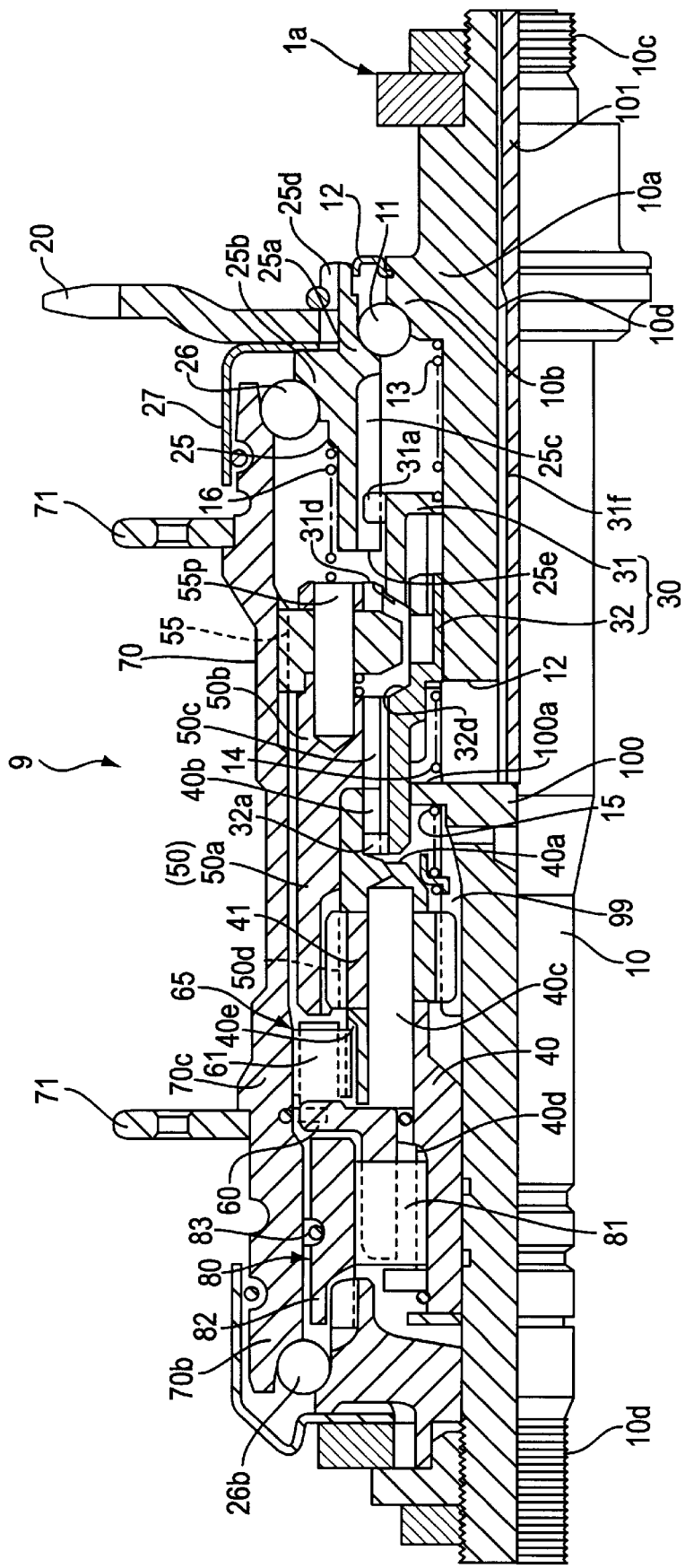
FIG. 3 is a partial cross sectional view of the transmission shown in FIG. 2.
Figure 5:
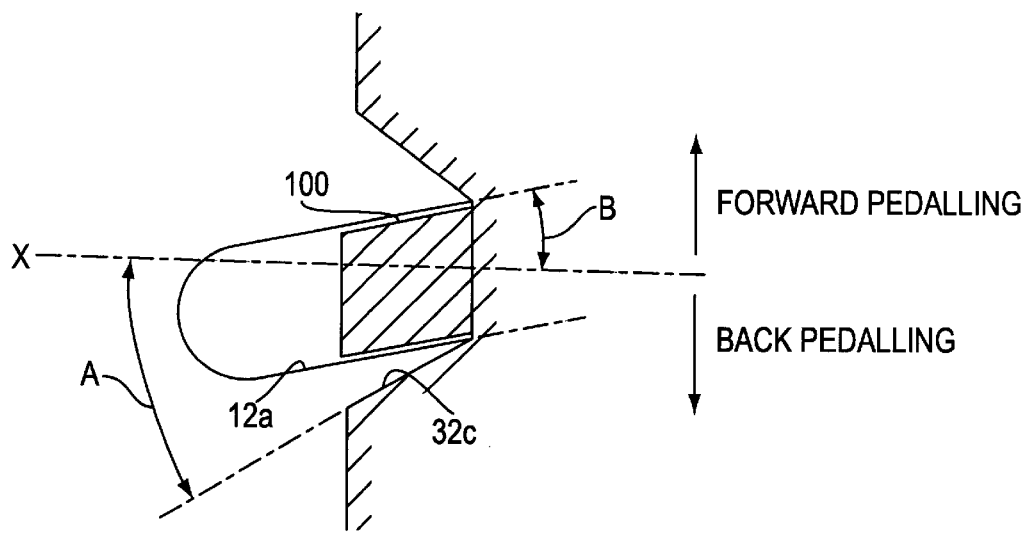
FIG. 5 is a view illustrating contact between a shift key and a cam face formed in the clutch shown in FIG. 4.
Figure 6:
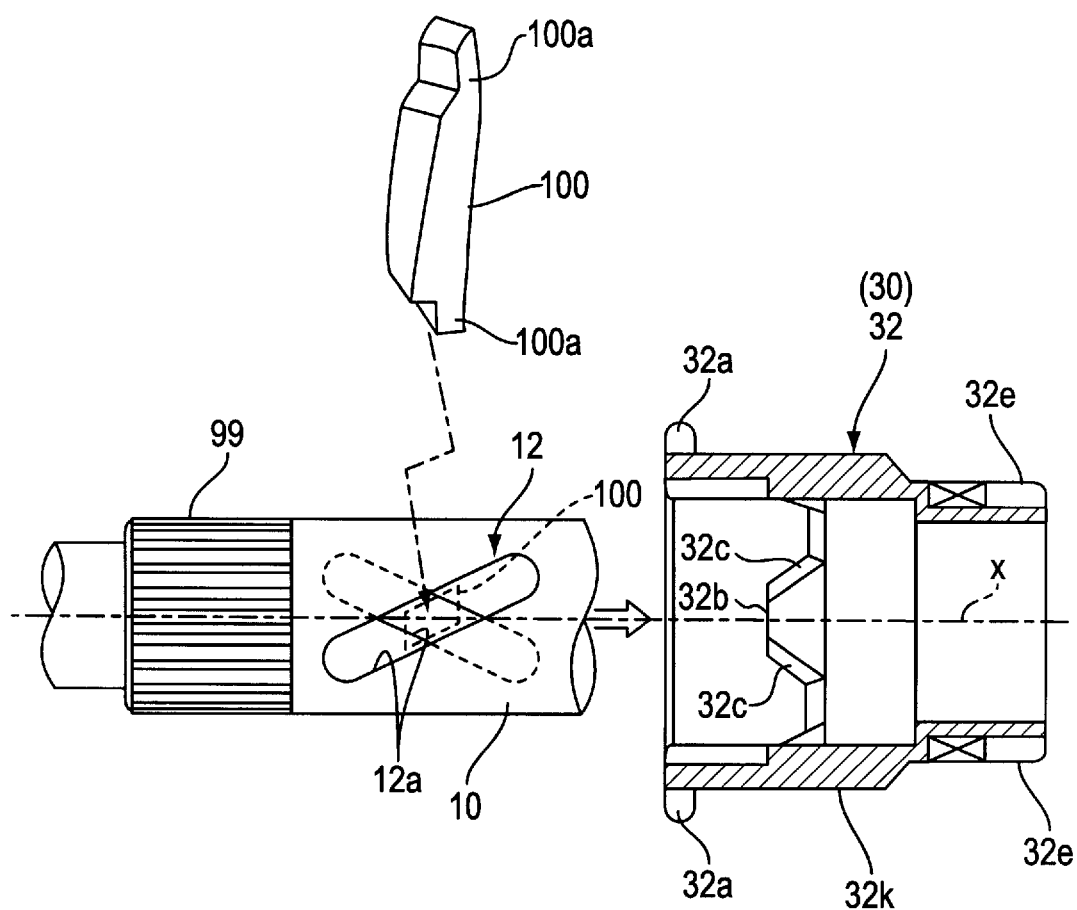
FIG. 6 is an exploded view of the clutch, shift key and axle used in the transmission shown in FIG. 2.

As shown in FIGS. 3 and 6, first shift key 100 passes through a groove 12 made in the hub axle 10 such that it intersects the axis X thereof in the radial direction, and it is operated from the outside of the internal shifter by bringing the hub axle 10 into contact with an operating bar 101 positioned in a hole 10d made in the axis X direction. As shown in FIG. 3, this operating bar 101 is only in contact with the end on the second end side and with the first shift key 100 in the center in the lengthwise direction of the first shift key, and is not linked. Therefore, the operating bar 101 is able to push the first shift key toward the second end, but it is unable to pull the first shift key 100 toward the first end. Therefore, movement toward the first end is accomplished by the energizing force of a third energizing spring 15 (discussed below). As shown in FIGS. 5 and 6, key groove 12 is provided such that it is inclined at a set angle called the groove inclination angle B with respect to the axis S in a plan view. Also, that portion of the groove 12 that is in contact with the first shift key 100 acts as a guide surface 12a, and the first shift key 100 moves along the groove 12 when the first shift key 100 is operated from the outside of the internal shifter.

The shape of the first shift key 100 is obtained by the overall twisting of a rectangular parallelepiped, and as a result, a cross section cut perpendicular to the lengthwise direction of the first shift key 100 is a parallel tetragon. The length of the first shift key 100 in its lengthwise direction is greater than the diameter of the hub axle 10, and when the first shift key 100 is inserted into the groove 12 of the hub axle 10, it protrudes from the outer peripheral surface of the hub axle 10 by a protrusion portion 100a. This protrusion portion 100a hits the second clutch.

As noted above, the clutch 30 is energized in the direction of the first shift key 100 by the first energizing spring 13. One end of this first energizing spring 13 is in contact with the lateral surface of the above-mentioned large diameter portion 10a of the hub axle 10, and the other end is in contact with a first spring engagement groove 31f provided to the inner peripheral surface on the first end side of the first clutch 31. As a result, the clutch 30 moves in the direction of the first shift key 100 until the clutch 30 reaches equilibrium with the operating force via the first shift key 100 and is positioned at the desired speed step.

As shown in FIG. 3, a second energizing spring 14 is provided around the outer periphery of the hub axle 10 at a position between the first shift key 100 and the second clutch 32. The length of this second energizing spring 14 is set by a spring setting washer such that the resulting set length will be such that when the first shift key 100 is moved in the direction of the second clutch 32, it will hit the second energizing spring 14 before the second clutch 32. A third energizing spring 15 that energizes the first shift key 100 in the direction of the second clutch is provided on the hub axle 10. The third spring acts as an assist spring that boosts the operating force when the first shift key 100 is exerting an operating force on the clutch. The spring coefficients of the first energizing spring 13 and the second energizing spring 14 are set to be roughly equal, while the spring coefficient of the third energizing spring 15 is set to be greater than the first and second springs. Therefore, when the shifter control 5 attached to the handle bar is operated and the inner cable pulled, the first shift key 100 will move in the second end direction against the energizing force of the third energizing spring via the operating bar 101. Conversely, when the inner cable is operated so that it is relaxed, the first shift key 100 will be moved in the direction of the second clutch 32 by the energizing force of the third energizing spring. When separation resistance is low, the spring force of the third energizing spring 15 will overcome the spring force of the first and second energizing springs and displace the clutch 30.

When the first shift key 100 moves in the second clutch direction, the first shift key 100 hits the second energizing spring 14 before hitting the second clutch 32, and moves the clutch 30 toward the first end, but as will be described below, when a load produced by the drive force is applied to the gear mechanism, there will be times when the clutch 30 does not move even if the first shift key 100 hits the second energizing spring 14. When the first shift key 100 is moved in this state further toward the second clutch 32 (toward the first end), then the first shift key 100 will hit the inner surface of the second clutch 32. In other words, when the drive force exerted on the gear mechanism is small and the separation resistance is low, the first shift key 100 can operate the clutch 30 without any contact with the inner surface of the second clutch 32. When the drive force is high, then the first shift key 100 will compress the second spring 14 and contact the inner surface of the second clutch 32.

Figure 4:
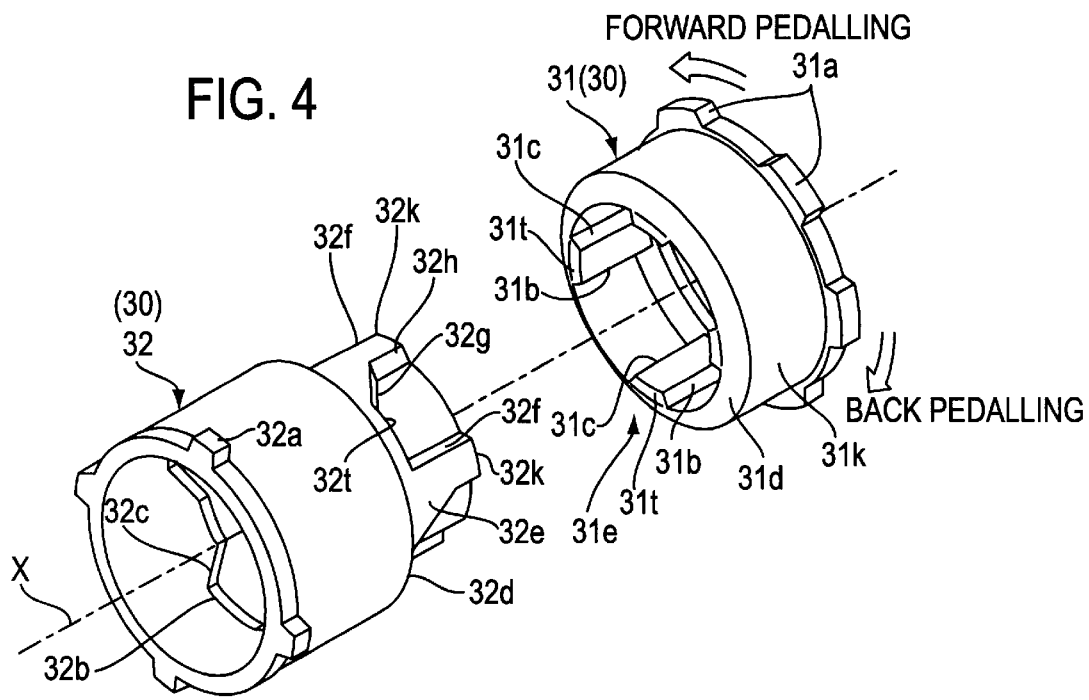
FIG. 4 is an exploded view of a particular embodiment of a clutch according to the present invention.

As shown in FIGS. 4 and 5, the inner surface of the second clutch 32 is provided with a contact surface 32b that extends in the radial direction and at a right angle to the axis X in a plan view, and with a first cam face 32c that extends in the radial direction and is inclined with respect to the axis X by a set angle A in a plan view. This angle A of the first cam face 32c with respect to the axis X is set so as to be greater than the groove inclination angle B of the first shift key guide surface 12a of the hub axle 10, as is clear from FIG. 5, and should preferably be between 20 and 70 degrees. It is even more preferable for this set angle A of the cam surface 32c to be from 35 to 55 degrees. It is preferable to set the groove inclination angle B to between 10 and 50 degrees.

The relation between the set angle A of the cam surface 12a and the angle B provided to the hub axle 10 will now be described. Assume driver 25 is driven by the depression of the pedals 6, and the first and second clutches correspondingly rotate in the forward pedalling direction. To simplify the description here, assume that the first shift key 100 is fixed so that it does not move in the axial direction.

When the first shift key 100 hits the first cam face 32c of the second clutch 32 as a result of the operation of the shifter 5, the rotational drive force from the driver 25 is applied to the first shift key 100. This force has a component in the axis X direction. Specifically, the first cam face 32c pushes the first shift key 100 toward the second end. An equal force in the opposite direction is produced as the reaction to this. Therefore, if it is assumed that the first shift key 100 is fixed, then the clutch 30 is displaced toward the first end in the axial direction. However, since the first shift key 100 is not actually fixed, the first shift key 100 sometimes overcomes the spring force of the third energizing spring as a result of the component in the axis X direction of the rotational drive force, and it moves toward the second end (to the left in the figure). In order to make this less likely, the shift key groove 12 provided to the hub axle 10 is inclined by the groove inclination angle B with respect to the axis X. Specifically, if the groove inclination angle B is larger, the force required to overcome the energizing force of the third energizing spring and move the first shift key 100 toward the second end will be correspondingly larger. Therefore, by adjusting the inclination angle A of the cam face and this groove inclination angle B and the spring force of the first through third energizing springs, it is possible to adjust the drive force applied to the driver 25 at which the clutch 30 will move toward the first end (to the right in the figure) when the first shift key 100 hits the second clutch 32.

In other words, when the first shift 100 key hits the clutch 30, both the first shift key 100 and the clutch 30 are capable of movement in the axial direction, so one or the other moves. When the drive load is extremely large, the first shift key 100 moves in the direction in which it separates from the clutch 30, and when the drive load is smaller than the set value, the action of the first shift key 100 causes the clutch 30 to move in the direction in which it separates from the first shift key 100. Which moves is affected by the drive load and the balance of the energizing springs, but the groove inclination angle B of the guide surface of this first shift key 100 with respect to the hub axis X also plays a major role. More specifically, compared to when this groove inclination B angle is zero, a greater force is needed to move the first shift key 100 against the spring force of the third energizing spring in the direction away from the clutch 30 when the groove inclination angle is not zero. Setting the angle of this groove to a suitable value makes it possible to adjust at what level of separation resistance the first shift key 100 will separate from the clutch 30 without moving the clutch 30 in the axial direction via the above-mentioned cam face 32c when the first shift key 100 is in contact with the clutch 30.

The linkage of the first clutch 31 and the second clutch 32, which are structural elements of the clutch 30, will now be described with reference to FIG. 4. As shown in FIG. 4, a plurality of engagement components 31e that protrude in the radial direction are formed on the inner peripheral surface of the first clutch 31. These engagement components 31e are approximately rectangular protrusions that extend parallel to the axis X direction, and flat surfaces 31b and 31c are formed on both sides thereof. On the first end side of the second clutch 32 are formed engaging components 32e that are inserted on the inner periphery on the second end side of the first clutch 31 and over which the above-mentioned engagement components 31e are able to slide. A plurality of leg components 32k are formed on the first end side of the engaging components 32e, and each of the above-mentioned leg components 32k forms a flat surface component 32f that extends parallel to the axial direction, an inclined surface 32g that is inclined in the axial direction, and an extension surface 32h that extends from this inclined surface and parallel to the axis X direction.

As shown in FIG. 4, the end surface 31t on the second end side of the first clutch 31 is linked to a cylinder component 31k by a step component 31d that corresponds to a first contact surface which inclines toward the outer peripheral surface 31k of the cylinder in a side view. The same holds true for the second clutch 32. More specifically, a step component 32d that corresponds to a second contact surface which inclines in the axis X direction is formed in the approximate middle of the outer peripheral surface of the second clutch 32.

In a state in which the internal hub 9 of the present invention is installed on the bicycle 1, the first clutch 31 is energized to the second end side by the first energizing spring (see FIG. 3) in a state in which no drive force is produced at the pedals, while the clutch 30 is maintained at its shortest length in the axis X direction in a state in which the end surface 31t on the second end side of the first clutch 31 is in contact with the base component 32t of a leg component 32k of the second clutch 32. Next, when a drive force in the forward direction of the bicycle acts on the pedals in this state, the driver 25 rotates in the first direction, or forward pedalling direction, and the first clutch 31 linked thereto rotates in the same direction. When the drive force in the forward pedalling direction is transmitted to the first clutch 31, the flat surface 31b side of the engagement component 31e is in contact with the inclined surface 32g of the second clutch 32, and when drive force in the same direction is continuously imparted, the second end side of the above-mentioned engagement component 31e slides over the above-mentioned inclined surface 32g, as a result of which the first clutch 31 moves toward the first end relative to the second clutch 32. When the flat surface 31b of the engagement component 31e hits the extension surface 32h of the second clutch 32, no force component that would separate the flat surface 31b and the extension surface 32h is generated between them, so the movement of the first clutch 31 in the axial direction with respect to the second clutch 32 comes to a halt, and the drive force transmitted to the first clutch 31 is conveyed to the second clutch 32.

As a result of the first clutch 31 and the second clutch 32 being thus structured, the drive force in the first rotational direction transmitted to the sprocket 20 causes the first clutch 31 to move away from the second clutch 32 toward the first end in the axial direction.

Consider a case in which a drive force is produced in the opposite direction from the first direction. In this case, the flat surface 31c on the side around the back pedalling direction in FIG. 4 of the engagement component 31e of the first clutch 31 is in contact with the flat surface 32f side of the second clutch 32, and the first clutch 31 drives the second clutch 32 in the back pedalling direction, which is the opposite of the forward pedalling direction. If a drive force in the back pedalling direction should act on the pedals in a state in which the flat surface 31b of the first clutch 31 is in contact with the extension surface 32h of the second clutch 32, then the flat surface 31b of the first clutch 31 that was in a state of contact immediately separates from the extension surface 32h, so the energizing force of the first energizing spring toward the second end component causes the first clutch 31 to move toward the second clutch 32. Thus, when a drive force in the reverse direction (the second rotational direction) acts on the pedals 6, the first clutch 31 moves toward the second end component of the second clutch 32, so the clutch 30 is displaced in the axis X direction to a state in which it is contracted to its shortest length.

The operation of the transmission pawl 55 by the clutch 30 will now be described.

Serrations 40b that extend in the axial direction are provided on the inside in the radial direction of the first end side of the planet gear rack 40. When the clutch 30 is in its first position corresponding to the first speed step and in its second position corresponding to the second speed step, the engagement pawl 32a provided on the outside in the radial direction of the second clutch 32 engages with these serrations 40b. Therefore, the length of these serrations 40b in the axial direction is roughly the same as or slightly greater than the amount of displacement in the axial direction of the clutch 30 in the first and second speed steps. The planet gear 41 is rotatably supported by the shaft 40c of this gear rack 40. This gear rack 40 is itself fitted on the outside of the hub axle 10 such that it is free to rotate.

The ring gear member 50 is in the overall form of a cylinder that extends in the axial direction, and it is made up of a cylinder component 50a that engages with the planet gear 41, and a support component 50b that supports the transmission pawl 55. As shown in FIG. 3, a pressing spring 16 that is used to fix the ring gear member 50 to a position in the direction of the second end is provided between the ring gear member 50 and the driver. A gear component that engages with the planet gear 41 is provided on the inside in the radial direction of the cylinder component 50a, and two windows in which are fixed a pin 55p (which is the support shaft that supports the transmission pawl 55 such that it can oscillate) are provided to the support component 50b. Serrations 50c that are used to engage the engagement pawls 32a when the clutch is in its third position corresponding to the third speed step are provided on the inside in the radial direction of this support component 50b.

The transmission pawl 55 acts as a one-way mechanism that is energized in the direction of engagement with the engagement teeth 70a provided to the hub body 70 by an energizing spring attached around the pin 55p provided to the support component 50b of the ring gear member 50, and it is capable of displacement between an upright state in which it is engaged with the hub body 70 and a reclined state in which it is disengaged. This transmission pawl 55 has a pawl component 55a that engages with the engagement teeth 70a of the hub body 70, a first contact component 55b formed as a cam face that comes into contact with the first clutch 31, and a second contact component 55c formed as a cam face that comes into contact with the second clutch 32. When the first clutch 31 or the second clutch is in contact with the transmission pawl 55, contact components 55b and 55c are pushed up to the outside in the radial direction, and the transmission pawl 55 enters its reclined state.

The planet gear rack 40 supports a roller clutch mechanism 65 that is used to transmit the drive force directly to the hub body 70. This roller clutch mechanism 65 comprises a plurality of rollers 61, a roller cam face 40e that is provided to the outer peripheral surface of the gear rack 40 and that is used to push up these rollers 61 to the outside in the radial direction, and a roller case 60 that is separate from the gear rack 40 and capable of rotation relative thereto. This roller clutch mechanism 65 transmits rotational drive force from the planet gear rack 40 to the hub body 70 when the planet gear rack 40 is rotated in the forward pedalling direction before the hub body, but the rollers idle and no drive force is transmitted to the hub body 70 when the hub body 70 is rotated in the forward pedalling direction before the planet gear rack 40.

In addition to the rollers 61, the roller case 60 also supports rollers 81 used for a coaster brake. This coaster brake 80 is known, and as such will not be described in detail herein, but is equipped with rollers 81, a cam face 40d that is provided to the outer peripheral surface of the gear rack 40 and that is used to push the rollers 81 to the outside in the radial direction when the driver 25 rotates in the reverse direction, and a brake shoe 82 that exerts a braking action on the inner surface 70b of the hub body 70.

The positional relationships of the various parts and the states of these parts will now be described through reference to FIGS. 3 and 7 through 14. In this embodiment, movement of the clutch 30 between first, second, and third positions at intervals in the axis X direction on the hub axle 10 makes three speeds possible, namely, top (the first speed step), neutral (the second speed step), and low (the third speed step).

Figure 7:
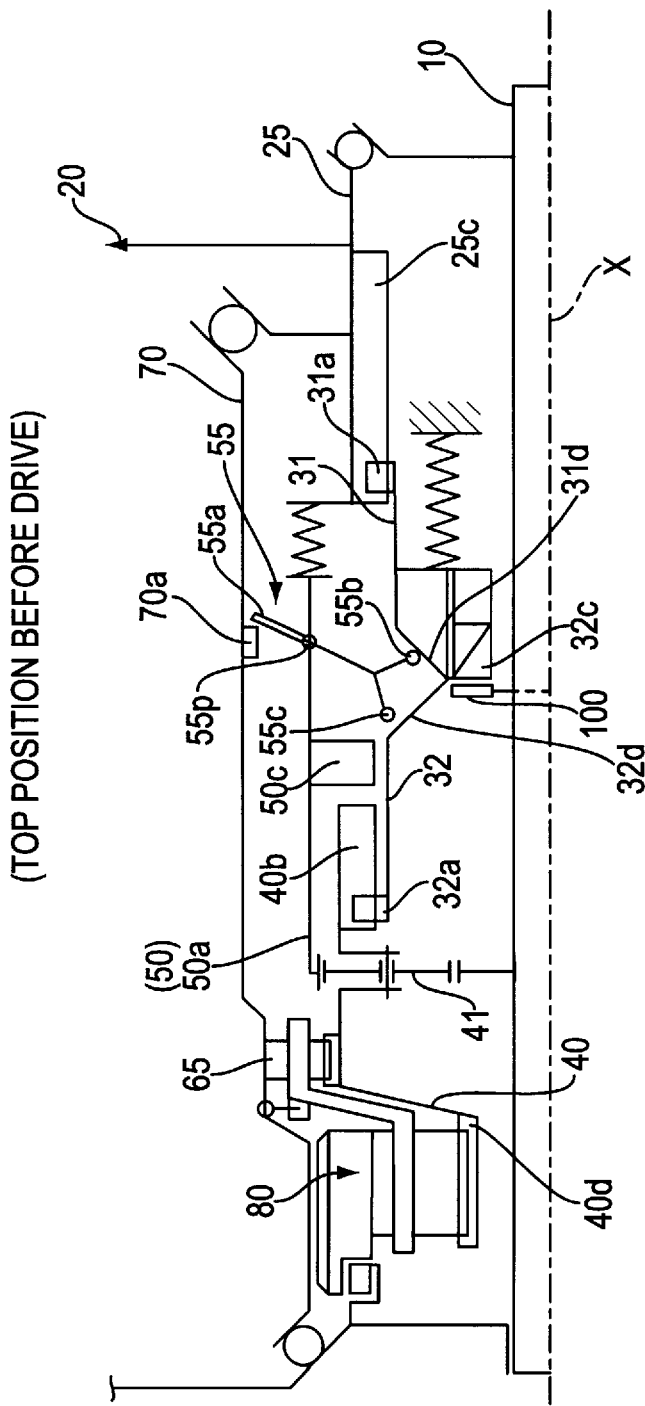
FIG. 7 is a schematic representation of the transmission components in a top gear position before drive power is applied.
Figure 8:
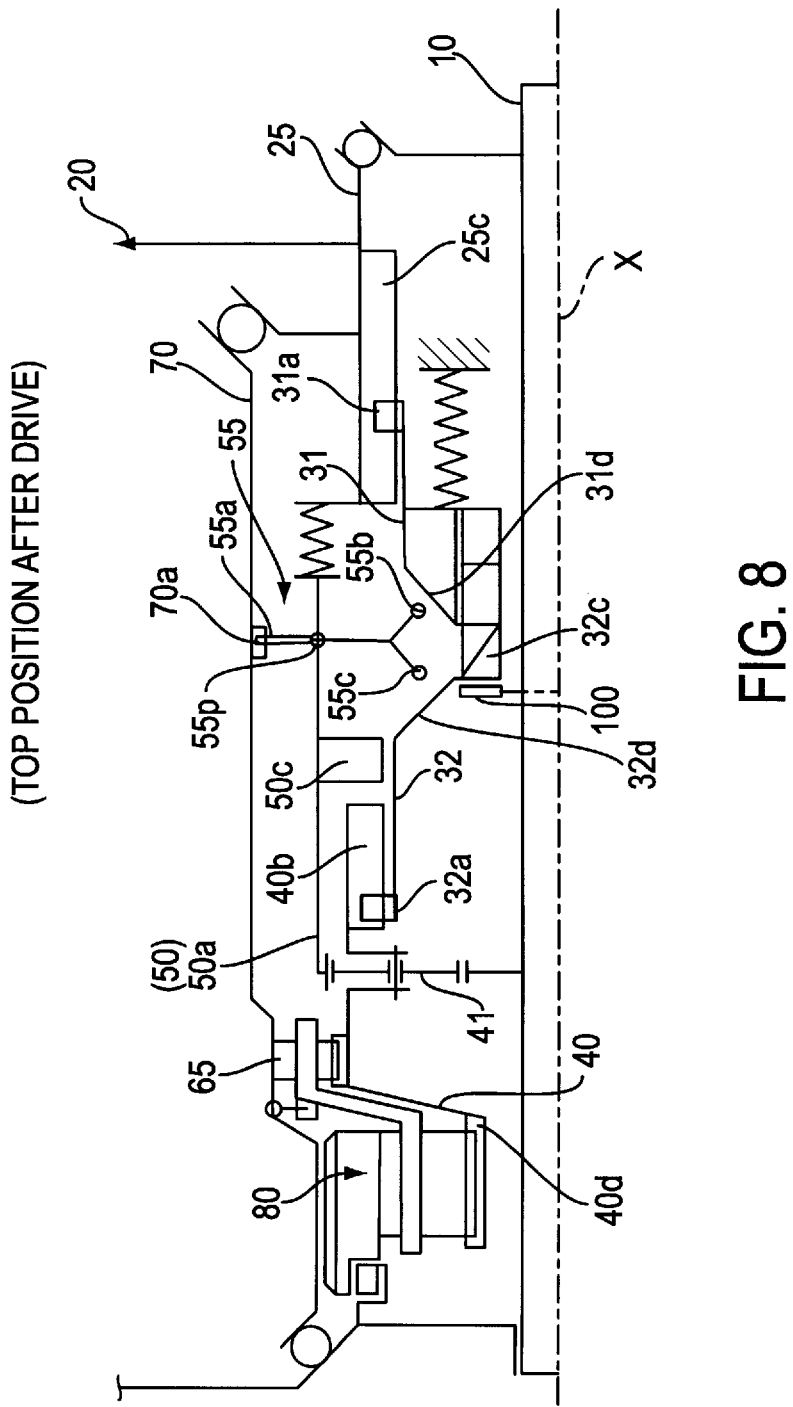
FIG. 8 is a schematic representation of the transmission components in a top gear position after drive power is applied.

The shifter 5 is operated and the inner cable pulled, which causes the shift key 100 to move via the operating bar 101 against the energizing force of the third energizing spring 15 to the first position (corresponding to the top position) shown in FIGS. 3, 7, and 8. At this point, the energizing force of the first energizing spring 13 causes the first clutch 31 and the second clutch 32 to move integrally in the direction of the shift key 100 until the second energizing spring 14 hits the shift key 100 and equilibrium is reached with the spring force of the first energizing spring. FIGS. 7 and 8 show the clutch 30 in its first position. Here, FIG. 7 shows a state in which the drive force corresponding to the forward pedalling direction does not act upon the first clutch 31 of the clutch 30, and FIG. 8 shows a state in which the drive force corresponding to the forward pedalling direction does act upon the first clutch 31.

Figure 11A:
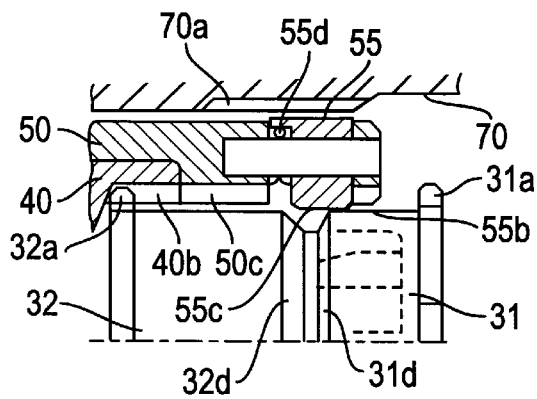
FIGS. 11a and 11b are partial cross sectional views of the positional relationship between the transmission pawl and clutch in the state shown in FIG. 7.
Figure 11B:
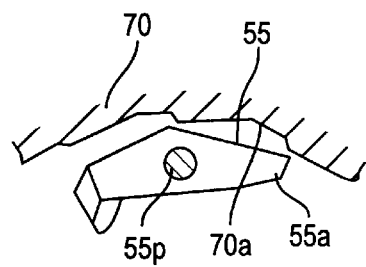

Specifically, in the state shown in FIGS. 7, 11(a) and (b), the first clutch 31 is energized by the first energizing spring 13 toward the second clutch 32, the contact surface 55b of the transmission pawl 55 is pushed up by the first contact surface 31d of the first clutch 31, the transmission pawl 55 swings about its linking pin 55p, and the pawl component 55a of the transmission pawl 55 is in a state of non-contact with the engagement teeth 70a of the hub body 70.

Figure 12A:
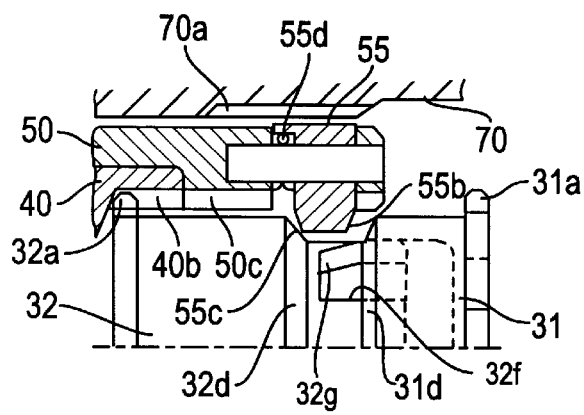
FIGS. 12a and 12b are partial cross sectional views of the positional relationship between the transmission pawl and clutch in the state shown in FIG. 8.
Figure 12B:
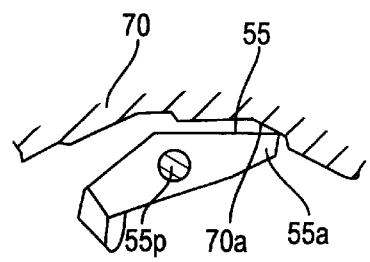

When a drive force in the forward pedalling direction (the first rotational direction) is then produced at the pedals 6, as discussed above, the end of the engagement component 31e of the first clutch 31 slides over the inclined surface 32g of the second clutch 32, and, as shown in FIGS. 8 and 12(a) and (b), the first clutch 31 and the second clutch 32 separate in the axial direction. In this state, the end on the contact side of the transmission pawl 55 is in a state of non-contact with the first clutch 31 and the second clutch 32, so it is raised up by the energizing spring 55d provided to the pivot shaft 55p of the transmission pawl 55. Therefore, when this state occurs, the pawl component 55a of the transmission pawl 55 is meshed with the engagement teeth 70a of the hub body 70, so power transmission is possible between the ring gear 50 and the hub body 70.

The drive force transmission path from the pedals 6 in this state is such that the power in the first rotational direction, i.e., the forward pedalling direction, from the pedals 6 is transmitted to the sprocket 20 and rotates the driver 25 to which the sprocket 20 is fixed. Then, as shown in FIG. 8, the power is transmitted to the first clutch 31 via the spline 25c of the driver 25 and the plurality of engagement pawls 31a of the first clutch 31. After this, the second clutch 32 is driven by contact between the flat surface 31b of the engagement component 31e formed on the inner peripheral surface of the first clutch 31 and the extension surface 32h of the second clutch 32. The drive force is then transmitted to the planet gear rack 40 by engagement between the engagement pawl 32a of the second clutch 32 and the serrations 40b of the planet gear rack 40. The drive force is transmitted to the ring gear member 50 by the meshing of the ring gear 50d with the planet gear 41 supported in a pivoting state by the planet gear rack 40, and the transmission pawl 55 linked to the ring gear member 50 is in an upright state, so the drive force of the ring gear member 50 is transmitted to the hub body 70 via the engagement teeth 70a (ratchet) on the inner periphery of the hub body 70.

A simplified explanation of the transmission path is as follows:

pedals 6→chain 8→sprocket 20→driver 25→first clutch 31→second clutch 32→planet gear rack 40→planet gear 41→ring gear member 50→transmission pawl 55→hub body 70→rear wheel 3.

In this manner, the drive force input from the pedals 6 is transmitted to the planet gear rack 40, and is boosted and transmitted to the ring gear member 50 by means of the revolution of the planet gear 41 around the hub axle 10 and by means of the rotation of the planet gear 41 about its pivot shaft.

Figure 9:
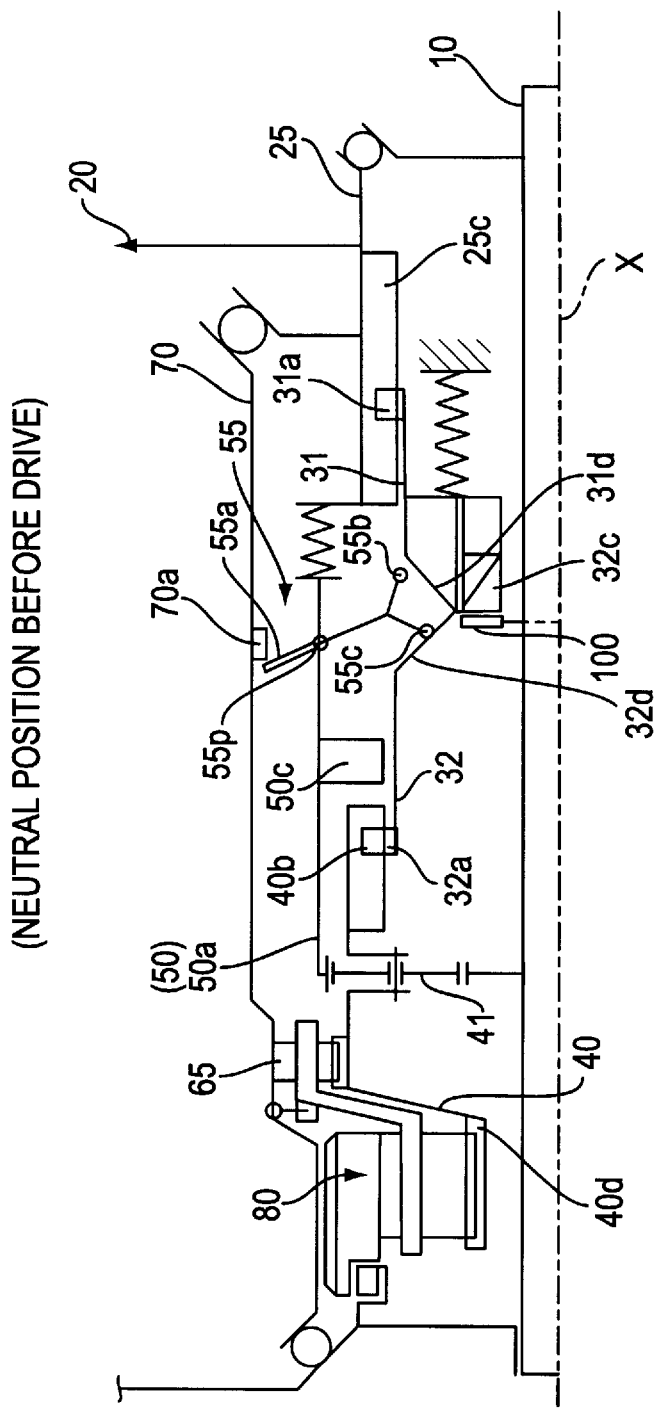
FIG. 9 is a schematic representation of the transmission components in a neutral gear position.
Figure 13A:
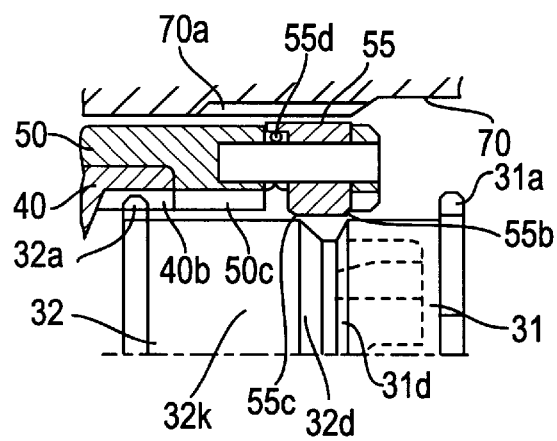
FIGS. 13a and 13b are partial cross sectional views of the positional relationship between the transmission pawl and clutch in the state shown in FIG. 9.
Figure 13B:
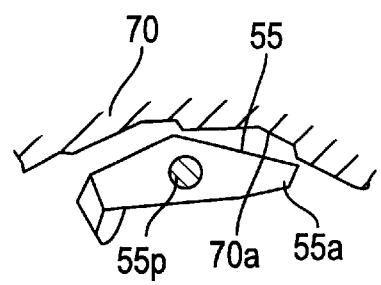

The transmission path of the power when the shifter 5 is operated and the clutch 30 is moved to the second position (neutral state) will now be described through reference to FIGS. 9, 13(*a*) and 13(*b*).

In this case, the power transmission path is as follows:

pedals 6→chain 8→sprocket 20→driver 25→spline 25*c* of the driver 25→engagement pawl 31*a* of the first clutch 31→first clutch 31→engagement component 31*e* of the first clutch 31→leg component 32*k* of the second clutch 32→second clutch 32 engagement pawl 32*a* of the second clutch 32→serrations 40*b* of the planet gear rack 40→planet gear rack 40→cam face 40*e* of the planet gear rack 40→roller clutch mechanism 65→inner periphery engagement surface 70*c* of the hub body 70→hub body 70 →rear wheel 3.

In this manner, the drive force input to the pedals 6 is transmitted directly to the planet gear rack 40 via the clutch 30, and it is transmitted to the hub body 70 via the roller clutch mechanism 65. The rotational speed of the driver 25 is essentially the same as the rotational speed of the hub body 70.

Figure 10:
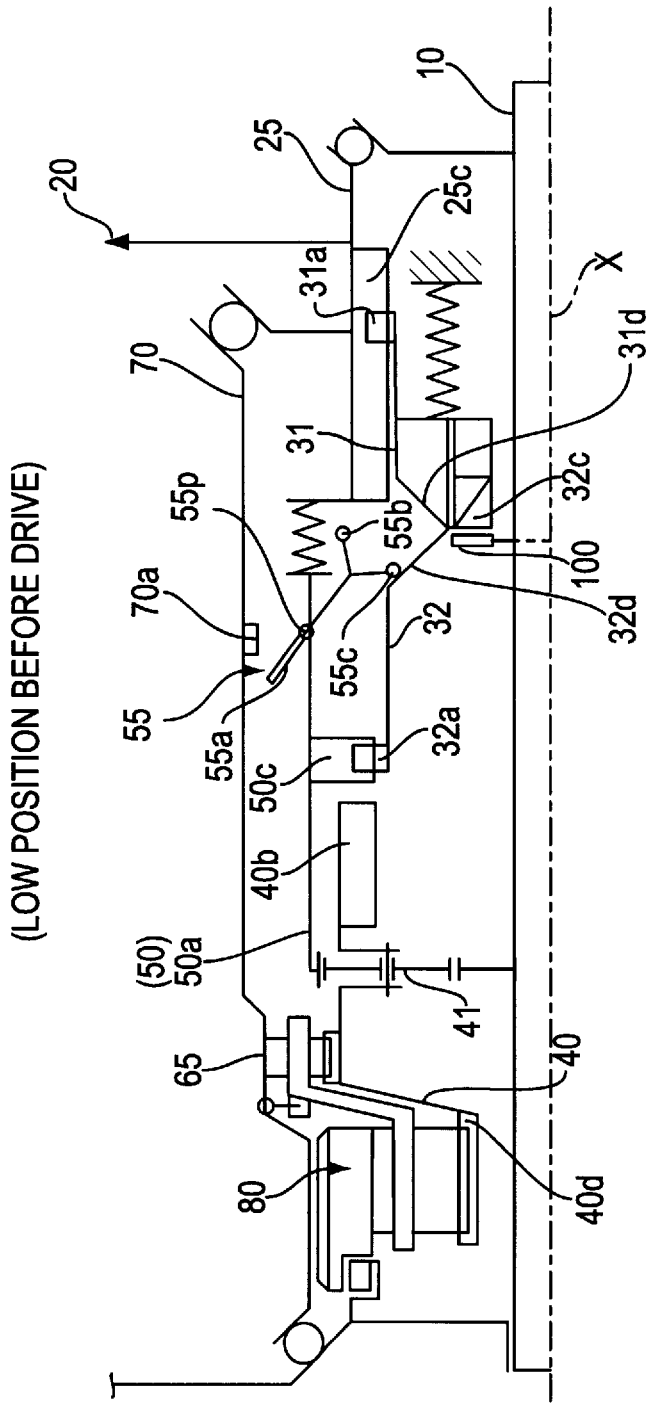
FIG. 10 is a schematic representation of the transmission components in a low gear position.
Figure 14A:
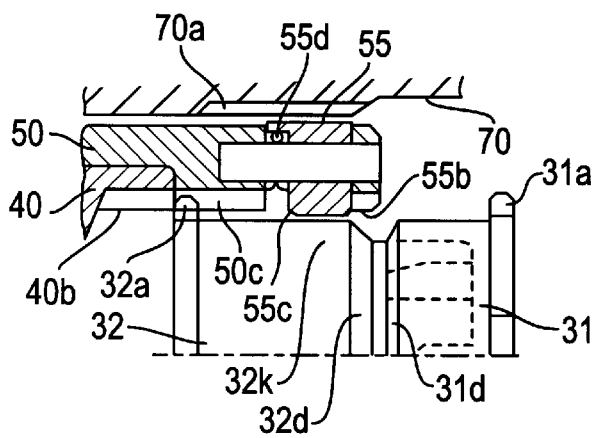
FIGS. 14a and 14b are partial cross sectional views of the positional relationship between the transmission pawl and clutch in the state shown in FIG. 10.
Figure 14B:
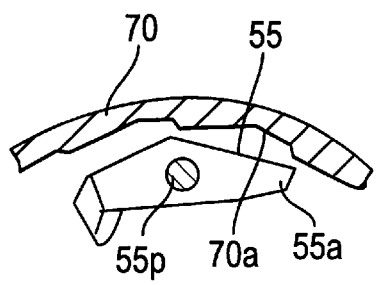

The transmission path of the power when the shifter 5 is operated and the clutch 30 is moved to the third position (low state) will now be described through reference to FIGS. 10, 14(*a*) and 14(*b*).

In this case, the power transmission path is as follows:

pedals 6→chain 8→sprocket 20→driver 25→spline 25*c* of the driver 25→engagement pawl 31*a* of the first clutch 31→first clutch 31→engagement component 31*e* of the first clutch 31→leg component 32*k* of the second clutch 32→second clutch 32→engagement pawl 32*a* of the second clutch 32→serrations 50*c* of the ring gear member 50→ring gear member 50→ring gear 50*d*→planet gear 41→pivot shaft 40*c* of the planet gear rack 40→planet gear rack 40→engagement surface 40*e* of the planet gear rack 40→roller clutch mechanism 65→inner periphery engagement surface 70*c* of the hub body 70→hub body 70→rear wheel 3.

In this manner, the drive force input via the pedals 6 is transmitted to the ring gear member 50 via the clutch 30 without being diminished, after which it is diminished by an amount corresponding to the rotation of the planet gear 41 by means of the meshing between the ring gear 50 and the planet gear 41, and rotational force is transmitted to the planet gear rack 40. The rotational force of the planet gear rack 40 is transmitted directly to the hub body 70 via the roller clutch mechanism 65.

Thus, it is possible to shift to the desired speed step by operating the shifter 5 and moving the clutch 30 between three different positions. Furthermore, as is clear from the above description, switching the transmission pawl 55 between its upright state and its reclined state by displacing the first clutch 31 in the axis X direction with respect to the second clutch 32 is possible in this embodiment only when a shift has been made to the top position corresponding to the first position. More specifically, in this embodiment, the transmission pawl 55 is designed so that it will be reclined during the reverse rotation of the driver 25.

The following problems would be encountered if the structure were such that the transmission pawl 55 would not be in a reclined state even during back pedalling. When the pedals 6 and the driver 25 are rotated backward in order to actuate the coaster brake, the brake is applied and the hub body 70 can no longer be rotated. If the transmission pawl 55 at this point is in an upright state and is engaged with the hub body 70, then when an attempt is made to rotate the pedals 6 forward in an effort to release the brake, rotation of the hub body 70 will be impossible because the driver 25 will be engaged with the hub body 70. Consequently, the brake cannot be released, resulting in the problem of so-called brake lock. Also, even on a bicycle not equipped with a coaster brake, if the transmission pawl 55 is in contact with the hub body 70 during the reverse rotation of the driver 25, then the transmission pawl 55 will be in contact with the hub body 70 and generate noise.

In this embodiment, in a state in which the drive force corresponding to the first rotational direction in the top position does not come into play and the first clutch 31 is pushed toward the second clutch 32 by the first energizing spring 13, that is, in a state in which the clutch 30 is retracted in the axis X direction, since the transmission pawl 55 is in a reclined state, there will be no contact between the transmission pawl 55 and the hub body 70 even if the pedals 6 are rotated backward in this state. As a result, the problem of brake lock will not be encountered.

In a state in which the drive force corresponding to the first rotational direction in the top position does come into play and the first clutch 31 is separated from the second clutch 32 in the axial direction, that is, in a state of extension of the clutch 30, since the first clutch 31 moves in the direction of the second clutch 32 when the drive force in the reverse direction acts upon the pedals 6, the transmission pawl 55 changes to a reclined state. Consequently, the problem of brake lock will not be encountered even if the pedals 6 are rotated backward in this state. Further, no noise is generated in a bicycle not equipped with a coaster brake.

FIG. 16 is a partial cross sectional view of an alternative embodiment of a bicycle transmission according to the present invention. The first embodiment described above included a clutch operating unit with which, when the shifter 5 was operated to shift from the first speed step to the second speed step in the down-shifting direction, for example, the rotational drive force of the driver 25 was utilized to allow the shift to be made. The second embodiment given here discloses a shifter equipped with a second shift key and a second cam face that is provided to the clutch 30 and corresponds to this second shift key, so that the rotational drive force can be utilized when shifting not only in the down-shifting direction, but also in the up-shifting direction. Basically, the only differences from the first embodiment are in the clutch 30 and in the clutch operation unit that operates this clutch, so those other portions that are common to the two embodiments will not be described here. The numbering in the figures is the same for any components that are the same as in the first practical example.

As shown in FIG. 16, the second shift key 105 is provided such that it goes through a groove 107 that is itself provided such that it goes through the hub axle 10 in the radial direction. A hole 105*b*, through which passes the operating bar 101 that goes through the hub axle 10 in the axis X direction, is provided in the center of this second shift key 105. This hole 105*b* extends perpendicular to the lengthwise direction of the second shift key 105, and it is provided at a position such that it coincides with the axis X of the hub axle 10 when the hub axle 10 is in its normal position.

The second shift key 105 is not directly operated by the operating bar 101. Instead, a tube 103 is provided around the outer periphery of the operating bar 101 and between the first shift key 100 and the second shift key 105 such that it is capable of movement relative to the operating bar 101.

The second end side of this tube 103 is only in contact with the first shift key 100, rather than being linked, and the first end side is in contact with the second shift key 105, but is not linked. With this arrangement, operation of the shifter 5 results in displacement of the first shift key in the clutch 30 direction, that is, toward the first end, via the operating bar 101, whereupon the tube 103 hits the first shift key 100 and moves toward the first end. As a result the second shift key 105 also moves away from the clutch 31, that is, toward the first end.

An energizing spring 110 that energizes the second shift key 105 in the direction of the clutch 31 is provided between the large diameter component 10a of the hub axle 10 and the second shift key 105. Therefore, when the first shift key moves away from the clutch 31, that is, toward the second end, the force of the energizing spring 110 moves the second shift key 105 in the direction of engagement with the clutch 31. An energizing spring 115 that is used to energize the clutch 30 toward the second end is provided between the driver 25 and the first clutch 31.

A second shift key groove 107 is provided such that it is inclined by a set angle called the groove inclination angle D with respect to the axis X in a plan view. That portion of the inner surface of the groove 107 that comes into contact with the second shift key 105 acts as a guide surface 107a, and the second shift key 105 moves along the groove 107 when the second shift key 105 is operated from outside the internal shifter.

The shape of the second shift key 105 is obtained by the overall twisting of a rectangular parallelepiped, just as with the first shift key 107, and as a result, a cross section cut perpendicular to the lengthwise direction of the second shift key 105 is a parallel tetragon. The length of the second shift key 105 in its lengthwise direction is greater than the diameter of the hub axle 10, and when the second shift key 105 is inserted into the groove 107 of the hub axle 10, it protrudes from the outer peripheral surface of the hub axle 10 by a protrusion portion 105a. This protrusion portion 105a hits the first clutch 31.

Figure 17:
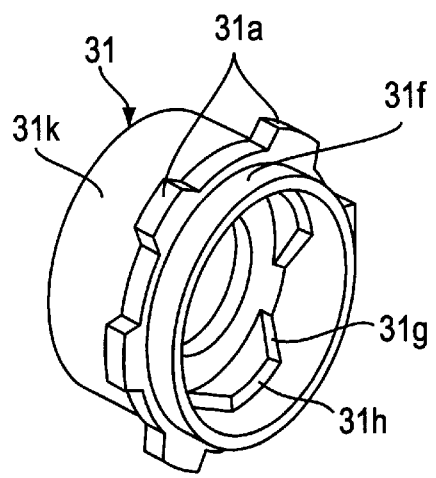
FIG. 17 is an oblique view of a particular embodiment of a clutch used in the transmission shown in FIG. 16.

The second shift key 105 hits the first clutch 31, but the first clutch 31 in this embodiment is similar to the second clutch 32 in the first embodiment. The first clutch 31 is the same overall as that in the first embodiment, but the portion that comes into contact with the second shift key 105 on the first end side is different. As shown in FIG. 17, teeth 31a that engage with the serrations 25c provided to the inner surface of the driver 25 are provided to the first clutch 31, and a skirt component 31f that extends from this position toward the first end is provided. The outside diameter of this skirt component 31f is smaller than the outside diameter of the outer periphery component 31k of the first clutch 31 shown in FIG. 4. A shoulder component is provided between the teeth 31a and the skirt component 31f, and one end of the energizing spring 115 is in contact here. A second cam face 31g that is the same as the first cam face 32c provided to the inner periphery of the second clutch 32 is provided to the inner periphery of the first clutch 31. When this second cam face 31g hits the second shift key 105, the drive force transmitted to the clutch 30 is converted into a force that operates the clutch 30 toward the second end.

Figure 18:
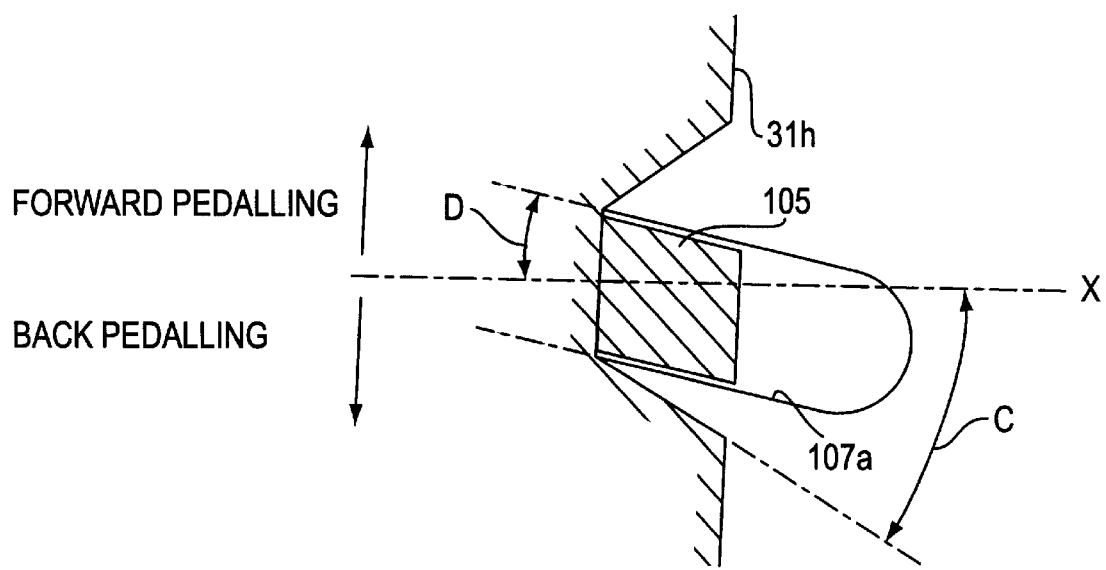
FIG. 18 is a view illustrating contact between a shift key and a cam face formed in the clutch shown in FIG. 17.

FIG. 18 shows the groove inclination angle D, which is the angle of the guide surface 107a provided to the groove 107 used for the second shift key 105 provided to the hub axle 10 with respect to the hub axis X, and the angle C of the second cam face 31g provided to the inner surface of the first clutch 31 with respect to the hub axis X. The relation between the groove inclination angle D and the angle C of the second cam face 31g is the same as the relation between the angle A of the first cam face 32c of the second clutch 32 with respect to the hub axis X and the angle B of the guide surface 12a for the first shift key 100 described in the first practical example, so this relation will not be described again here.

With the above structure, the rotational drive force can be utilized not only in the down-shift direction, but also in the up-shift direction, so smooth gear shifting is possible when a drive load is applied to the gear mechanism and a change in the speed step is difficult.

While the above is a description of various embodiments of the present invention, further modifications may be employed without departing from the spirit and scope of the present invention. Thus, the scope of the invention should not be limited by the specific structures disclosed. Instead, the true scope of the invention should be determined by the following claims. Of course, although labeling symbols are used in the claims in order to facilitate reference to the figures, the present invention is not intended to be limited to the constructions in the appended figures by such labeling.

What is claimed is:

1. A bicycle transmission comprising:
    a hub axle (10);
    a drive member (25) rotatably mounted around the hub axle (10);
    a hub body (70) rotatably mounted around the hub axle (10);
    a planetary gear mechanism (99,40,41,50) coupled between the drive member (25) and the hub body (70) for communicating rotational force from the drive member (25) to the hub body (70) through multiple transmission paths;
    a clutch (30) rotatably mounted around the hub axle (10) for rotation in response to rotation of the drive member (25), wherein the clutch (30) is movable in the direction of a longitudinal axis (X) of the hub axle (10) for selecting a rotational force transmission path through the planetary gear mechanism (99,40,41,50);
    a clutch operator for operating the clutch (30), wherein the clutch operator includes:
        a first guide surface (12a, 107a) formed along the hub axle (10); and
        a first shift key (100,105) that operates the clutch (30) when the first shift key (100,105) is moved along the first guide surface (12a,107a); and
    wherein the clutch (30) includes a first cam face (32c,31g) that is inclined relative to the axis (X) of the hub axle (10) for contacting the first shift key (100,105) and for converting rotational force of the clutch (30) into axial displacement of the clutch (30).

2. The transmission according to claim 1 further comprising:
    a first spring (13) for biasing the clutch (30) toward the first shift key (100); and
    a second spring (15) for biasing the first shift key (100) toward the clutch (30).

3. The transmission according to claim 2 further comprising a third spring (14) for biasing the first shift key (100) and the clutch (30) away from each other when the third spring (14) contacts both the first shift key (100) and the clutch (30).

4. The transmission according to claim 3 wherein a spring coefficient of the second spring (15) is greater than a spring coefficient of the third spring (14).

5. The transmission according to claim 1 wherein an angle of inclination (A,C) between the first cam face (32c,31g) and the axis (X) of the hub axle (10) is between approximately 20 degrees and approximately 70 degrees.

6. The transmission according to claim 1 wherein an angle of inclination (B,D) between the first guide surface (12a, 107a) and the axis (X) of the hub axle (10) is between approximately 10 degrees and approximately 50 degrees.

7. The transmission according to claim 1 wherein the hub axle includes a groove (12,107) which defines the first guide surface (12a, 107a), and wherein the first guide surface (12a,107a) is inclined relative to the axis (X) of the hub axle (10).

8. The transmission according to claim 7 wherein an angle of inclination (A,C) between the first cam face (32c,31g) and the axis (X) of the hub axle (10) is greater than an angle of inclination (B,D) between the first guide surface (12a,107a) and the axis (X) of the hub axle (10).

9. The transmission according to claim 8 wherein the angle of inclination (A,C) between the first cam face (32c, 31g) and the axis (X) of the hub axle (10) is between approximately 20 degrees and approximately 70 degrees.

10. The transmission according to claim 9 wherein the angle of inclination (B,D) between the first guide surface (12a,107a) and the axis (X) of the hub axle (10) is between approximately 10 degrees and approximately 50 degrees.

11. The transmission according to claim 1 wherein the first shift key (100,105) is shaped as a twisted rectangular parallelepiped, and wherein an end face of the first shift key (100,105) is oriented substantially perpendicular to the axis (X) of the hub axle (10).

12. The transmission according to claim 1 wherein the clutch operator further comprises:
a second guide surface (107a) formed along the hub axle (10); and
a second shift key (105) that operates the clutch (30) when the second shift key (105) is moved along the second guide surface (107a); and
wherein the clutch (30) further includes a second cam face (31g) that is inclined relative to the axis (X) of the hub axle (10) for contacting the second shift key (105) and for converting rotational force of the clutch (30) into axial displacement of the clutch (30).

13. The transmission according to claim 12 further comprising:
a first spring (115) for biasing the clutch (30) toward the first shift key (100);
a second spring (15) for biasing the first shift key (100) toward the clutch (30); and
a third spring (110) for biasing the second shift key (105) toward the clutch (30).

14. The transmission according to claim 13 further comprising a fourth spring (14) for biasing the first shift key (100) and the clutch (30) away from each other when the fourth spring (14) contacts both the first shift key (100) and the clutch (30).

15. The transmission according to claim 14 wherein a spring coefficient of the second spring (15) is greater than a spring coefficient of the fourth spring (14).

16. The transmission according to claim 12 wherein the hub axle includes a groove (107) which defines the second guide surface (107a), and wherein the second guide surface (107a) is inclined relative to the axis (X) of the hub axle (10).

17. The transmission according to claim 12 wherein an angle of inclination (D) between the second guide surface (107a) and the axis (X) of the hub axle (10) is between approximately 10 degrees and approximately 50 degrees.

18. The transmission according to claim 12 wherein an angle of inclination (C) between the second cam face (31g) and the axis (X) of the hub axle (10) is between approximately 20 degrees and approximately 70 degrees.

19. The transmission according to claim 12 wherein an angle of inclination (C) between the second cam face (31g) and the axis (X) of the hub axle (10) is greater than an angle of inclination (D) between the second guide surface (107a) and the axis (X) of the hub axle (10).

20. The transmission according to claim 19 wherein the angle of inclination (C) between the second cam face (31g) and the axis (X) of the hub axle (10) is between approximately 20 degrees and approximately 70 degrees.

21. The transmission according to claim 20 wherein the angle of inclination (D) between the second guide surface (107a) and the axis (X) of the hub axle (10) is between approximately 10 degrees and approximately 50 degrees.

22. The transmission according to claim 12 wherein the second shift key (105) is shaped as a twisted rectangular parallelepiped, and wherein an end face of the second shift key (105) is oriented substantially perpendicular to the axis (X) of the hub axle (10).

23. A bicycle transmission comprising:
a hub axle (10);
a drive member (25) rotatably mounted around the hub axle (10);
a hub body (70) rotatably mounted around the hub axle (10);
a planetary gear mechanism (99,40,41,50) coupled between the drive member (25) and the hub body (70) for communicating rotational force from the drive member (25) to the hub body (70) through multiple transmission paths;
a clutch (30) rotatably mounted around the hub axle (10), wherein the clutch (30) is movable in the direction of a longitudinal axis (X) of the hub axle (10) for selecting a rotational force transmission path through the planetary gear mechanism (99,40,41,50);
a clutch operator for operating the clutch (30), wherein the clutch operator includes:
a first guide surface (12a,107a) formed along the hub axle (10); and
a first shift key (100,105) that operates the clutch (30) when the first shift key (100,105) is moved along the first guide surface (12a,107a);
wherein the clutch (30) includes a first cam face (32c,31g) that is inclined relative to the axis (X) of the hub axle (10) for contacting the first shift key (100,105) and for converting rotational force of the clutch (30) into axial displacement of the clutch (30);
a first spring (13) for biasing the clutch (30) toward the first shift key (100);
a second spring (15) for biasing the first shift key (100) toward the clutch (30); and
a third spring (14) for biasing the first shift key (100) and the clutch (30) away from each other when the third spring (14) contacts both the first shift key (100) and the clutch (30).

24. The transmission according to claim 23 wherein a spring coefficient of the second spring (15) is greater than a spring coefficient of the third spring (14).

25. A bicycle transmission comprising:
a hub axle (10);
a drive member (25) rotatably mounted around the hub axle (10);

a hub body (70) rotatably mounted around the hub axle (10);

a planetary gear mechanism (99,40,41,50) coupled between the drive member (25) and the hub body (70) for communicating rotational force from the drive member (25) to the hub body (70) through the multiple transmission paths;

a clutch (30) rotatably mounted around the hub axle (10), wherein the clutch (30) is movable in the direction of a longitudinal axis (X) of the hub axle (10) for selecting a rotational force transmission path through the planetary gear mechanism (99,40,41,50);

a clutch operator for operating the clutch (30), wherein the clutch operator includes:
  a first guide surface (12*a*,107*a*) formed along the hub axle (10); and
  a first shift key (100,105) that operates the clutch (30) when the first shift key (100,105) is moved along the first guide surface (12*a*,107*a*);

wherein the clutch (30) includes a first cam face (32*c*,31*g*) that is inclined relative to the axis (X) of the hub axle (10) for contacting the first shift key (100,105) and for converting rotational force of the clutch (30) into axial displacement of the clutch (30); and wherein the hub axle includes a groove (12,107) which defines the first guide surface (12*a*,107*a*), and wherein the first guide surface (12*a*,107*a*) is inclined relative to the axis (X) of the hub axle (10).

26. A bicycle transmission comprising:

a hub axle (10);

a drive member (25) rotatably mounted around the hub axle (10);

a hub body (70) rotatably mounted around the hub axle (10);

a planetary gear mechanism (99,40,41,50) coupled between the dive member (25) and the hub body (70) for communicating rotational force from the drive member (25) to the hub body (70) through multiple transmission paths;

a clutch (30) rotatably mounted around the hub axle (10), wherein the clutch (30) is movable in the direction of a longitudinal axis (X) of the hub axle (10) for selecting a rotational force transmission path through the planetary gear mechanism (99,40,41,50);

a clutch operator for operating the clutch (30), wherein the clutch operator includes:
  a first guide surface (12*a*,107*a*) formed along the hub axle (10), and
  a first shift key (100,105) that operates the clutch (30) when the first shift key (100,105) is moved along the first guide surface (12*a*,107*a*);

wherein the clutch (30) includes a first cam face (32*c*,31*g*) that is inclined relative to the axis (X) of the hub axle (10) for contacting the first shift key (100,105) and for converting rotational force of the clutch (30) into axial displacement of the clutch (30); and wherein an angle of inclination (B,D) between the first guide surface (12*a*,107*a*) and the axis (X) of the hub axle (10) is between the approximately 10 degrees and approximately 50 degrees.

27. A bicycle transmission comprising:

a hub axle (10);

a drive member (25) rotatably mounted around the hub axle (10);

a hub body (70) rotatably mounted around the hub axle (10);

a planetary gear mechanism (99,40,41,50) coupled between the drive member (25) and the hub body (70) for communicating rotational force from the dive member (25) to the hub body (70) through multiple transmission paths;

a clutch (30) rotatably mounted around the hub axle (10), wherein the clutch (30) is movable in the direction of a longitudinal axis (X) of the hub axle (10) for selecting a rotational force transmission path through the planetary gear mechanism (99,40,41,50);

a clutch operator for operating the clutch (30), wherein the clutch operator includes:
  a first guide surface (12*a*,107*a*) formed along the hub axle (10); and
  a first shift key (100,105) that operates the clutch (30) when the first shift key (100,105) is moved along the first guide surface (12*a*,107*a*);

wherein the clutch (30) includes a first cam face (32*c*,31*g*) that is inclined relative to the axis (X) of the hub axle (10) for contacting the first shift key (100,105) and for converting rotational force of the clutch (30) into axial displacement of the clutch (30);

wherein an angle of inclination (A,C) between the first cam face (32*c*,31*g*) and the axis (X) of the hub axle (10) is greater than an angle of inclination (B,D) between the first guide surface (12*a*,107*a*) and the axis (X) of the hub axle (10).

28. The transmission according to claim 27 wherein the angle of inclination (A,C) between the first cam face (32*c*, 31*g*) and the axis (X) of the hub axle (10) is between approximately 20 degrees and approximately 70 degrees.

29. The transmission according to claim 28 wherein the angle of inclination (B,D) between the first cam face (12*a*, 107*a*) and the axis (X) of the hub axle (10) is between approximately 10 degrees and approximately 50 degrees.

30. A bicycle transmission comprising:

a hub axle (10);

a drive member (25) rotatably mounted around the hub axle (10);

a hub body (70) rotatably mounted around the hub axle (10);

a planetary gear mechanism (99,41,40,50) coupled between the drive member (25) and the hub body (70) for communicating rotational force from the drive member (25) to the hub body (70) through the multiple transmission paths;

a clutch (30) rotatably mounted around the hub axle (10), wherein the clutch (30) is movable in the direction of a longitudinal axis (X) of the hub axle (10) for selecting a rotational force transmission path through the planetary gear mechanism (99,40,41,50);

a clutch operator for operating the clutch (30), wherein the clutch operator includes:
  a first guide surface (12*a*,107*a*) formed along the hub axle (10); and
  a first shift key (100,105) that operates the clutch (30) when the first shift key (100,105) is moved along the first guide surface (12*a*,107*a*);

wherein the clutch (30) includes a first cam face (32*c*,31*g*) that is inclined relative to the axis (X) of the hub axle (10) for contacting the first shift key (100,105) and for converting rotational force of the clutch (30) into axial displacement of the clutch (30); and wherein the first shift key (100,105) is shaped as a twisted rectangular parallelepiped, and wherein an end face of the first shift key (100,105) is oriented substantially perpendicular to the axis (X) of the hub axle (10).

31. A bicycle transmission comprising:

a hub axle (10);

a drive member (25) rotatably mounted around the hub axle (10);

a hub body (70) rotatably mounted around the hub axle (10);

a planetary gear mechanism (99,41,40,50) coupled between the drive member (25) and the hub body (70) for communicating rotational force from the drive member (25) to the hub body (70) through the multiple transmission paths;

a clutch (30) rotatably mounted around the hub axle (10), wherein the clutch (30) is movable in the direction of a longitudinal axis (X) of the hub axle (10) for selecting a rotational force transmission path through the planetary gear mechanism (99,40,41,50);

a clutch operator for operating the clutch (30), wherein the clutch operator includes:

a first guide surface (12*a*,107*a*) formed along the hub axle (10); and a first shift key (100,105) that operates the clutch (30) when the first shift key (100,105) is moved along the first guide surface (12*a*,107*a*);

a second guide surface (107*a*) formed along the hub axle (10);

a second shift key (105) that operates the clutch (30) when the second shift key (105) is moved along the second guide surface (107*a*);

wherein the clutch (30) includes:

a first cam face (32*c*,31*g*) that is inclined relative to the axis (X) of the hub axle (10) for contacting the first shift key (100,105) and for converting rotational force of the clutch (300) into axial displacement of the clutch (30); and a second cam face (31*g*) that is inclined relative to the axis (X) of the hub axle (10) for contacting the second shift key (105) and for converting the rotational force of the clutch (30) into axial displacement of the clutch (30).

32. The transmission according to claim 31 further comprising:

a first spring (115) for biasing the clutch (30) toward the first shift key (100);

a second spring (15) for biasing the first shift key (100) toward the clutch (30); and a third spring (110) for biasing the second shift key (105) toward the clutch (30).

33. The transmission according to claim 32 further comprising a fourth spring (14) for biasing the first shift key (100) and the clutch (30) away from each other when the fourth spring (14) contacts both the first shift key (100) and the clutch (30).

34. The transmission according to claim 33 wherein a spring coefficient of the second spring (15) is greater than a spring coefficient of the fourth spring (14).

35. The transmission according to claim 31 wherein the hub axle includes a groove (107) which defines the second guide surface (107*a*), and wherein the second guide surface (107*a*) is inclined relative to the axis (X) of the hub axle (10).

36. The transmission according to claim 31 wherein an angle of inclination (D) between the second guide surface (107*a*) and the axis (X) of the hub axle (10) is between approximately 10 degrees and approximately 50 degrees.

37. The transmission according to claim 31 wherein an angle of inclination (C) between the second cam face (31*g*) and the axis (X) of the hub axle (10) is between approximately 20 degrees and approximately 70 degrees.

38. The transmission according to claim 31 wherein an angle of inclination (C) between the second cam face (31*g*) and the axis (X) of the hub axle (10) is greater than an angle of inclination (D) between the second guide surface (107*a*) and the axis (X) of the hub axle (10).

39. The transmission according to claim 38 wherein the angle of inclination (C) between the second cam face (31*g*) and the axis (X) of the hub axle (10) is between approximately 20 degrees and approximately 70 degrees.

40. The transmission according to claim 39 wherein the angle of inclination (D) between the second guide surface (107*a*) and the axis (X) of the hub axle (10) is between approximately 10 degrees and approximately 50 degrees.

41. The transmission according to claim 31 wherein the second shift key (105) is shaped as a twisted rectangular parallelepiped, and wherein an end face of the second shift key (105) is oriented substantially perpendicular to the axis (X) of the hub axle (10).

* * * * *